(12) United States Patent
Ferlin et al.

(10) Patent No.: US 8,079,621 B2
(45) Date of Patent: Dec. 20, 2011

(54) REINFORCED BEAD TUBE DESIGN

(75) Inventors: William Joseph Ferlin, Franklin, TN (US); Timothy J. Tupa, Springfield, TN (US)

(73) Assignee: Lincoln Brass Works, Inc., Waynesboro, TN (US)

( * ) Notice: Subject to any disclaimer, the term of this patent is extended or adjusted under 35 U.S.C. 154(b) by 278 days.

(21) Appl. No.: 12/313,142

(22) Filed: Nov. 17, 2008

(65) Prior Publication Data

US 2009/0189391 A1    Jul. 30, 2009

Related U.S. Application Data

(60) Provisional application No. 61/003,162, filed on Nov. 15, 2007.

(51) Int. Cl.
*F16L 19/00* (2006.01)
(52) U.S. Cl. .......... 285/353; 285/384; 285/382.5
(58) Field of Classification Search .......... 285/353, 285/384, 382.5
See application file for complete search history.

(56) References Cited

U.S. PATENT DOCUMENTS

| | | | |
|---|---|---|---|
| 509,743 A | 11/1893 | Lane | |
| 1,804,814 A | 5/1931 | Schultis | |
| 2,306,702 A | 12/1942 | Koerner | |
| 2,545,930 A | 3/1951 | Richardson | |
| 2,599,389 A * | 6/1952 | Hume | 285/353 |
| 2,685,461 A | 8/1954 | Mueller | |
| 2,757,966 A * | 8/1956 | Samiran | 285/384 |
| 3,092,404 A | 6/1963 | MacWilliam | |
| 3,207,534 A * | 9/1965 | Kimbrell et al. | 285/353 |
| 3,393,930 A | 7/1968 | Ziherl et al. | |
| 3,751,002 A | 8/1973 | Folkerts et al. | |
| 4,133,565 A | 1/1979 | Shutt | |
| 4,200,314 A | 4/1980 | Ridenour | |
| 4,262,942 A | 4/1981 | Ridenour | |
| 4,325,571 A | 4/1982 | Funderburg et al. | |
| 4,538,842 A | 9/1985 | Kowal et al. | |
| 4,754,995 A * | 7/1988 | Takahashi et al. | 285/353 |
| 4,871,199 A | 10/1989 | Ridenour et al. | |
| 5,025,990 A | 6/1991 | Ridenour | |
| 5,092,634 A | 3/1992 | Miller | |
| 5,169,182 A * | 12/1992 | Hashimoto | 285/353 |
| 5,332,161 A | 7/1994 | Schweitzer et al. | |
| 5,516,157 A | 5/1996 | Williamson | |
| 5,529,349 A | 6/1996 | Gibbs et al. | |
| 5,544,406 A | 8/1996 | Ridenour et al. | |
| 5,573,285 A | 11/1996 | Ridenour | |
| 5,597,186 A | 1/1997 | Ridenour et al. | |
| 5,607,194 A | 3/1997 | Ridenour | |
| 5,658,025 A | 8/1997 | Ridenour | |
| 5,707,087 A | 1/1998 | Ridenour et al. | |
| 5,832,588 A | 11/1998 | Ridenour et al. | |
| 5,851,110 A | 12/1998 | Ridenour | |
| 5,979,430 A | 11/1999 | Peed et al. | |

(Continued)

*Primary Examiner* — David E Bochna
(74) *Attorney, Agent, or Firm* — Harness, Dickey & Pierce, P.L.C.

(57) ABSTRACT

A tube fitting assembly is provided for a gas burner. The assembly includes a pre-deformed tube connector having first and second ends. At least one of the ends is provided an annular sealing bead formed by compressing and cold working at least two intermediate annular beads together. A first coupling member is provided defining a cavity and having a shaped seating surface adapted to sealingly engage a cooperating surface of the annular sealing bead. A second coupling member is provided rotatably and slidably disposed on the pre-deformed tube connector and is adapted to mate with the first coupling member.

14 Claims, 8 Drawing Sheets

U.S. PATENT DOCUMENTS

| | | |
|---|---|---|
| 6,030,003 A | 2/2000 | Peed et al. |
| 6,068,471 A | 5/2000 | Ridenour |
| 6,170,888 B1 * | 1/2001 | Ridenour .................... 285/382.5 |
| RE37,246 E | 6/2001 | Ridenour |
| 6,527,304 B1 * | 3/2003 | Pliassounov .................. 285/353 |
| 6,575,502 B1 | 6/2003 | Ridenour |
| 6,604,762 B2 | 8/2003 | Sagaser |
| 6,663,146 B1 | 12/2003 | Sakai et al. |
| 6,729,659 B2 | 5/2004 | Schroeder et al. |
| 6,840,550 B2 | 1/2005 | Sundholm |
| 6,851,729 B2 | 2/2005 | Gibson |
| 6,877,779 B2 | 4/2005 | Kerr et al. |
| 6,945,569 B1 | 9/2005 | Diaz et al. |
| 6,988,748 B2 | 1/2006 | Staniszewski et al. |
| 7,032,934 B2 | 4/2006 | Wosik |
| 7,062,834 B2 | 6/2006 | Patterson et al. |
| 7,533,909 B2 * | 5/2009 | Sausner et al. ................ 285/353 |
| 2007/0046026 A1 | 3/2007 | Wells et al. |

\* cited by examiner

FINISH

REINFORCED BEAD TUBE DESIGN

CROSS-REFERENCE TO RELATED APPLICATION

This application claims the benefit of U.S. Provisional Application Ser. No. 61/003,162, filed Nov. 15, 2007. The entire disclosure of the above application is incorporated herein by reference.

FIELD OF THE INVENTION

The present invention relates to gas tube fittings, and in particular to a bead tube used to seal pressurized liquids or gases, and a process of forming the same.

BACKGROUND AND SUMMARY

The statements in this section merely provide background information related to the present disclosure and may not constitute prior art.

Tubular connectors for fluid carrying conduits are generally known in the art. Tube connections, or fittings, are also known that provide a fluid tight seal and additionally allow repeated assemblies and disassemblies for use and reuse. In various prior art gas tube assemblies, a gas tube is placed in an appropriate fitting and is compressed and plastically deformed while torque is applied during the assembly process such that a line seal is created between the gas tube and adjacent couplings. The amount of torque applied may differ, and if not carefully measured, there may be variations in the amount of plastic deformation of the gas tube. For example, the difference in length between an original and deformed (assembled) flare-type fitting is generally a function of the amount of fastening torque applied. In many instances, the large extent to which the deformed areas may be axially compressed has provided a good seal, despite the variable amount of torque applied to the fitting members. However, this has a potential for inconsistent assemblies and problems if it is desired that components of the connection, such as the tube member, be assembled and later disassembled and/or reused.

Accordingly, there remains a need for improved joints between gas sources, gas controls, gas burner units, and the like that provide better and consistent sealing along with ease of manufacturing. Specifically, there has been a need for a pre-deformed tubular connector that does not deform during the assembly process.

The present disclosure is directed to a reusable tube fitting assembly, and in particular, for use with a gas burner. The assembly includes a pre-deformed tube connector having first and second ends. At least one of the ends is provided an annular sealing bead formed by compressing and cold working at least two intermediate annular beads together. A first coupling member is provided defining a cavity and having a shaped seating surface adapted to sealingly engage a cooperating surface of the annular sealing bead. A second coupling member is provided rotatably and slidably disposed on the pre-deformed tube connector and is adapted to mate with the first coupling member. A sealing member may optionally be provided radially aligned on the pre-deformed tube connector and disposed between the annular sealing bead and the second coupling member. The annular sealing bead may be formed between a lead-on portion and a main body portion of the tube connector, wherein the respective outer and inner diameters of the lead-on portion and the main body portion are substantially the same. In accordance with the teachings of the present disclosure, the pre-deformed tube connector does not require any plastic deformation during assembly of the first and second coupling members to form a fluid tight seal.

The present disclosure also provides a method of pre-forming an aluminum tubular connector for subsequent joining with a gas fitting. The method includes providing an aluminum tube having a substantially uniform thickness, inner diameter, and outer diameter. First and second sections of the aluminum tube are aligned into a press assembly. The press assembly is engaged and forms first and second intermediate annular bead members. The method continues by compressing the first and second annular beads within the press assembly to form one primary annular bead member. An exterior annular sealing surface is formed at an end of the primary annular bead member. In certain aspects, the exterior annular sealing surface may be formed having an angle of about 45 degrees. In other embodiments, the exterior annular sealing surface may be provided having an arcuate shape with a predetermined radius of curvature. The method of pre-forming an aluminum tubular connector may be one continuous press operation, or alternatively, may include a two-step process. In certain embodiments, a press assembly engages a first punch member to form the first and second intermediate annular beads. A second punch member is then used to compress the intermediate beads to form the primary annular bead member.

Further areas of applicability will become apparent from the description provided herein. It should be understood that the description and specific examples are intended for purposes of illustration only and are not intended to limit the scope of the disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the invention, its application, or uses.

With reference to the attached figures, the bead tube design and method according the principles of the present disclosure will now be described.

Figure 1A:
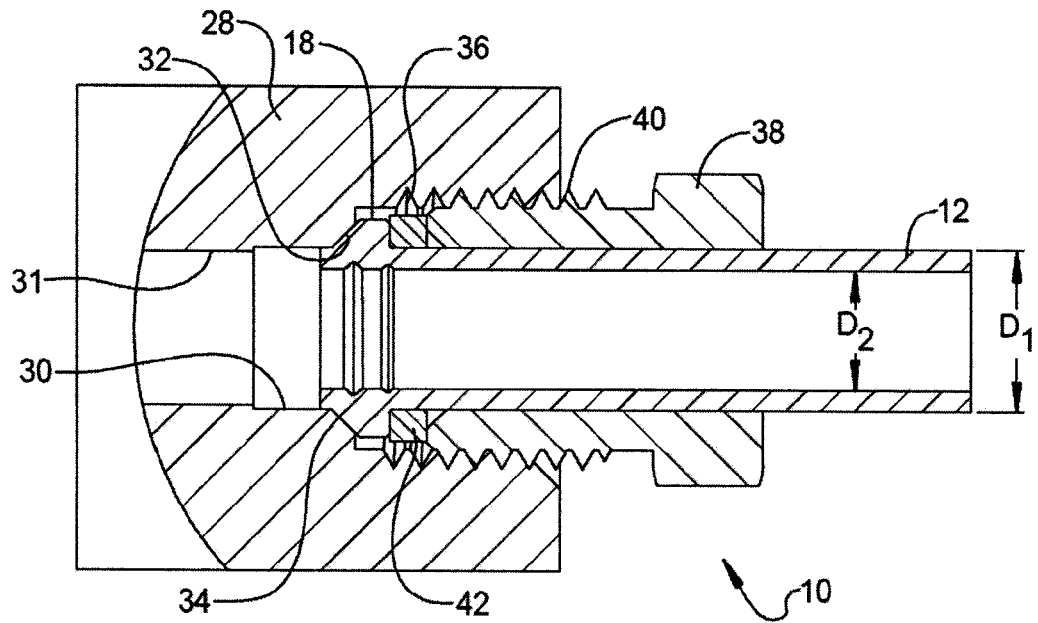
FIG. 1A is partial cross sectional view of an exemplary gas fitting joint using a bead tube prepared according to the principles of the present disclosure.
Figure 1B:
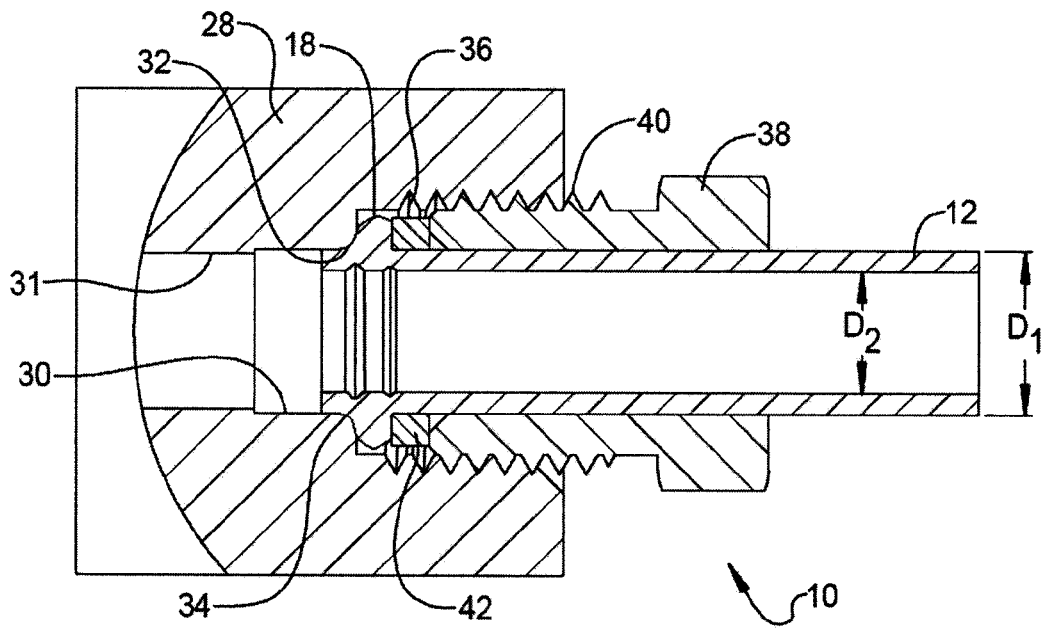
FIG. 1B is a partial cross sectional view of a gas fitting joint using a bead tube prepared according to another aspect of the present disclosure.

FIG. 1A illustrates a cross-sectional view of one embodiment of an exemplary gas fitting assembly 10, or joint, using a bead tube 12 prepared according to the principles of the present disclosure. FIG. 1B illustrates a cross-sectional view of another embodiment having an arcuately shaped sealing surface as will be discussed below. The bead tube member 12 may have an outer diameter ($D_1$) of between about ⅛ inch to about ⅝ inch, or greater if desired; more common dimensions include an outer diameter of ¼ inch or ⅜ inch. Based on the diameter size, the bead tube member 12 may be provided with a wall thickness of between about 0.020 inch and 0.038 inch.

The assembly 10 includes a pre-deformed bead tube member 12, or tube connector, having first and second ends 14, 16. As will be described in more detail, at least one of the ends 14 is provided with an annular sealing bead 18 formed by compressing and cold working at least two intermediate annular beads 20, 22 together. The annular sealing bead 18 may be formed between a lead-on portion 24 and a main body portion 26 of the tube connector 12, wherein the respective outer and inner diameters $D_1$, $D_2$ of the lead-on 24 portion and the main body portion 26 are substantially the same. In various aspects, the pre-deformed tube connector 12 may have a substantially constant inner diameter $D_2$ along its entire length, while the outer diameter $D_1$ is substantially constant with the exception of the annular sealing bead 18 area.

A first coupling member 28 is provided defining a cavity 30 and having a shaped sealing surface 32 adapted to sealingly engage a cooperating surface 34 of the annular sealing bead 18. Such a cavity 30 may further define shoulder areas 31 and other specific configurations, as desired. As illustrated, the first coupling member 28 may be a female type fitting having internal female threads 36. A second coupling member 38 is provided that is rotatably and slidably disposed over the pre-deformed tube connector 12 and is adapted to mate with the first coupling member 28. As illustrated, the second coupling member 38 is a nut, or male type fitting, having external threads 40. As those skilled in the art can understand, while the fitting assembly 10 is illustrated as having a female type first coupling member 28 and a male type second coupling member 38, such coupling members can be readily interchanged and the fitting assembly 10 can be provided with a male type first coupling member and a female type second coupling member (configuration not shown).

According to one embodiment, the pre-deformed tube member 12 is made of aluminum or an aluminum alloy material and at least one or both of the first and second coupling members 28, 38 is made of brass or an equivalent metal or alloy. In other aspects, the first and second couplings may respectively comprise steel and brass, steel and steel, brass and steel, aluminum and brass, and aluminum and steel.

In various aspects, at least one sealing member 42 is optionally provided and slidably retained along the tube member 12. The sealing member 42 may be radially aligned on the pre-deformed tube connector 12 and disposed between the annular sealing bead 18 and the second coupling member 38. The sealing member 42 may be of any type as generally known in the art and may include, for example, springs or pressure retaining devices, washers, coil springs, O-rings, spiral springs, leaf springs, helical coils, compressible washers, and the like.

Figure 2:
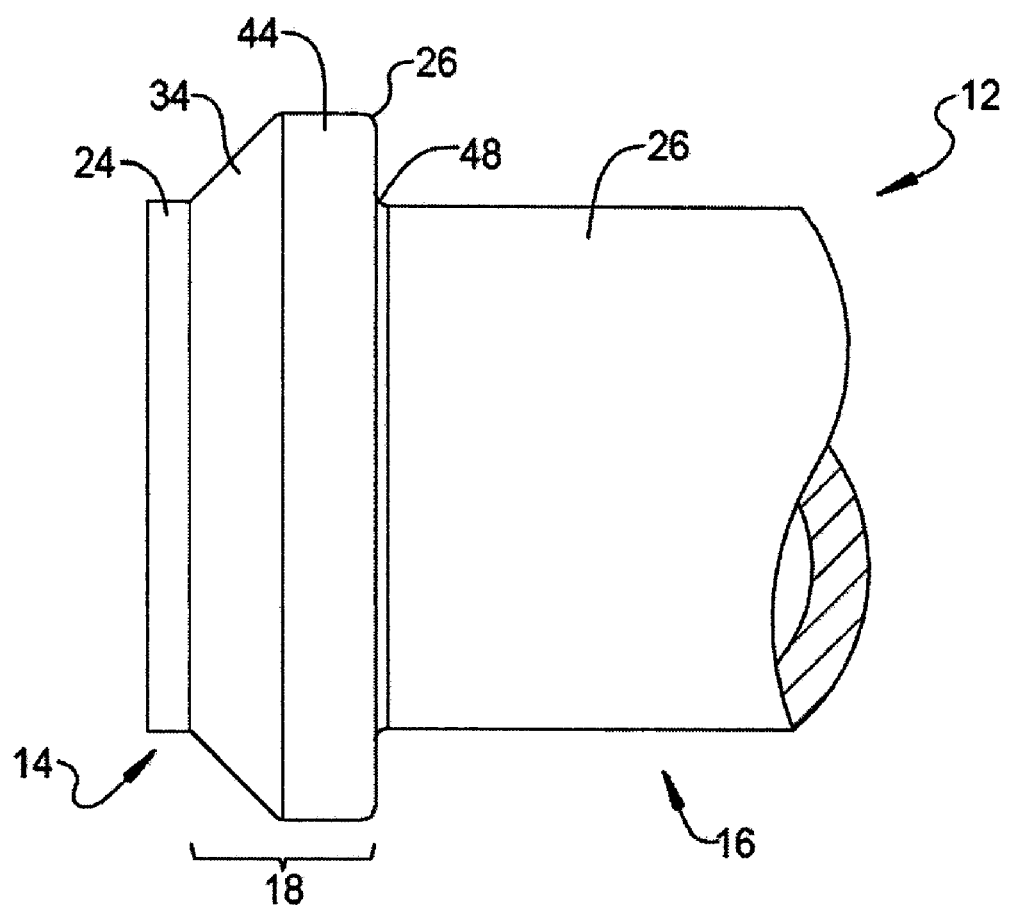
FIG. 2 is a partial side plan view of one end of the bead tube having an angled sealing surface.

With reference to FIG. 2, the pre-deformed tube connector 12 may be provided with an annular sealing bead 18 having a primary sealing surface portion 34 and a secondary portion 44. In various aspects, the primary sealing surface portion 34 may be provided having an angle of about 45 degrees and configured to form a fluid tight seal with the corresponding sealing surface 32 of the first coupling member 28. Since the tube member 12 is compressed and cold worked prior to the final assembly process, it is envisioned that the tube member 12 will not undergo any plastic deformation during the assembly of the first and second coupling members 28, 38 and will provide a seal at least equal to or better than those that are deformed during the final assembly, typically via the application of an external fastening torque. Thus, in accordance with the teachings of the present disclosure, the pre-deformed tube connector does not require any plastic deformation during assembly of the first and second coupling members to form a fluid tight seal.

As illustrated in FIG. 2, the exterior annular sealing surface 34 comprises about one half of the width of the primary bead member 18 and the remainder, or secondary portion 44 may be formed having a substantially uniform exterior surface at about a 90 degree angle relative to a central axis of the tube member 12. The secondary portion may be provided with a slight chamfer on its edge 26 followed by a seating surface configured for mating with the second coupling member 38. As shown, there may be a slight radius of curvature 48 where the annular sealing bead 18 meets the main body section 26 of the tube member 12.

Figure 3:
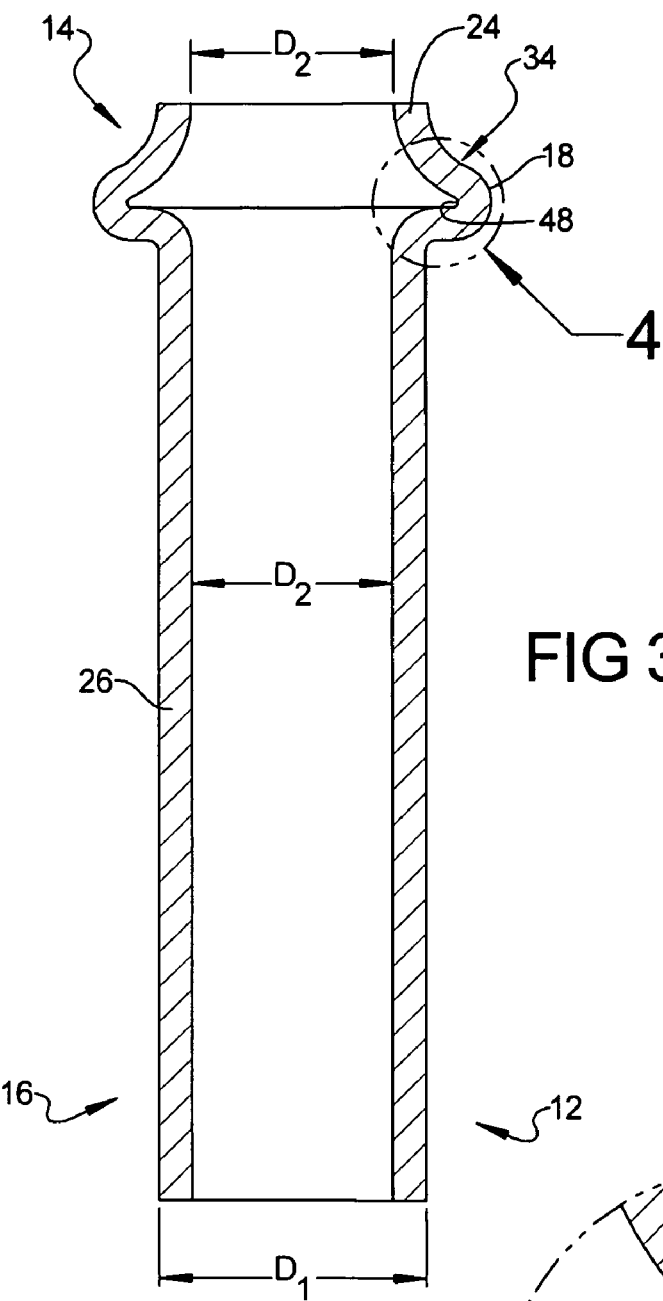
FIG. 3 is a partial longitudinal cross-sectional view illustrating an alternate embodiment of a bead tube having an arcuate, curved sealing surface.
Figure 4:
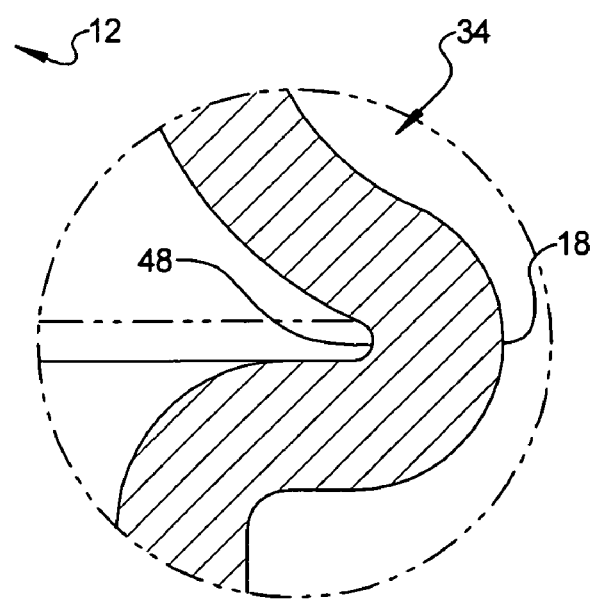
FIG. 4 is a partial magnified view of FIG. 3.

FIG. 3 is a longitudinal cross-sectional view illustrating an alternate embodiment of a bead tube member 12 wherein the annular sealing bead 18 includes an arcuate shaped portion, or curved sealing surface 34 with a predetermined radius of curvature. It should be understood that if such a desired arcuate shape is desired that the first coupling member 28 would also be provided with a cooperating arcuately shaped seating surface 32 in order to have a proper metal-to-metal line seal, as shown in FIG 1B. In certain embodiments, it may be desired to leave a minimal sized gap in the interior region of the annular sealing bead 18. FIG. 4 is a partial magnified view of FIG. 3 and further illustrates such a gap that may have a predetermined radius of curvature 48. In other embodiments, it may be desired to provide the annular sealing bead 18 without such a gap (not shown).

With reference to FIGS. 5A-5G, the present disclosure is also directed to a method of pre-forming a tubular connector 12, such as aluminum, that can be used for joining with first and second coupling members for a gas fitting assembly 10. The method includes providing a blank tube 12 having a substantially uniform thickness, inner diameter $D_2$, and outer diameter $D_1$. First and second sections 52, 54 of the blank tube 12 are aligned into a press assembly 50. An exemplary press assembly 50 may include a die member 56 and a punch member 58. In various embodiments, the punch member 58 may be machined such that it can accept and grippingly engage the inner diameter $D_2$ of the first section 52 of the blank tube 12 in a close-tolerance fit. Likewise, the die member 56 may be machined such that it can accept and grippingly engage the outer diameter $D_1$ of the second section 54 of the blank tube 12 in a close-tolerance fit.

Figure 6:
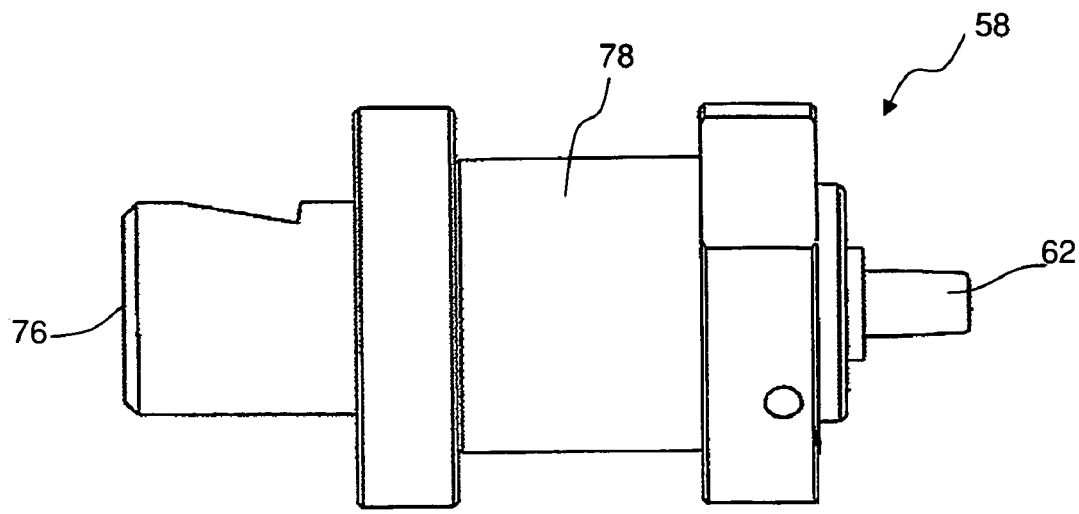
FIG. 6 is a side plan view of an alternate embodiment of a press-type forming tool.
Figure 7:
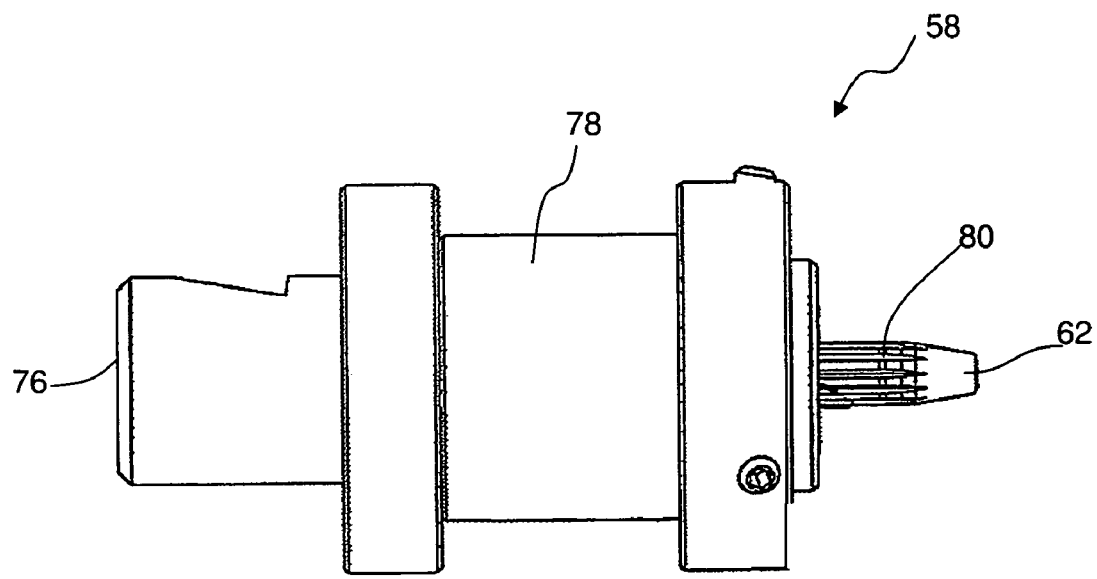
FIG. 7 is a side plan view of another alternate embodiment of a press forming tool.

FIGS. 6 and 7 illustrate side plan views of alternate embodiments of a punch member 58 for use in the press-type forming tool. The punch member 58 typically has a punch base 76 connected to the main body portion 78. The punch member 58 may be provided with a pin or an extending portion 62 that serves to maintain a uniform inner diameter $D_2$ at the bead member 18 area of the tube 12 during the press operations. In certain aspects, as shown in FIG. 7, the extending portion 62 may be provided having a slightly tapered radial profile where it meets the tube 12 so as to minimize any potential for misalignment between the punch member 58 and the tube 12 during the manufacturing process. The extending portion may also be provided with grooves 80 to allow the displacement of any oil, if used during the punch process.

Figure 5A:
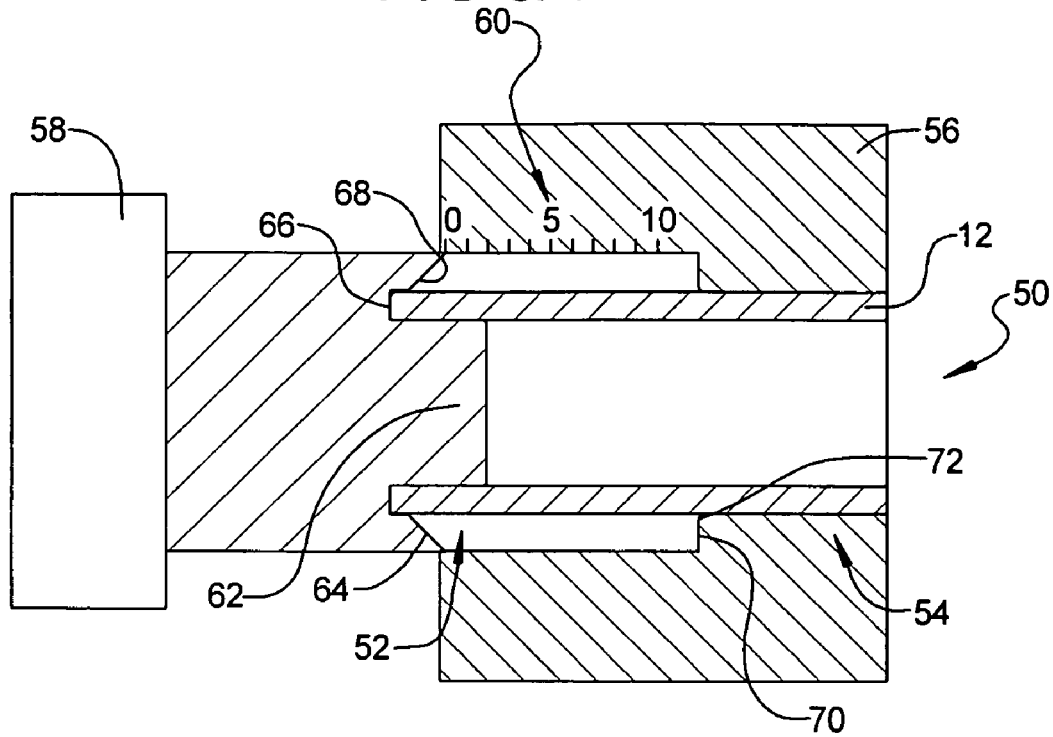
FIGS. 5A-5G each illustrate partial longitudinal cross-sectional views of a bead tube within an exemplary press-type forming tool assembly at various intermediate stages during the process steps according to the principles of the present disclosure.

With renewed reference to FIG. 5A, once the punch member 58 is aligned with the die member 56, the edges 64 of the punch member may cooperate with the die member 56 to define a cavity 66 and wall 68 that serve as a mold for the cold worked metal to flow during the press operation to form the desired lead-on portion 24 and angled sealing surface 34 of the annular bead member 18. The die member 56 may be provided with a suitable interior seating surface 70 and corner region 72 operable to define the remainder of the annular bead 18.

Figure 5B:
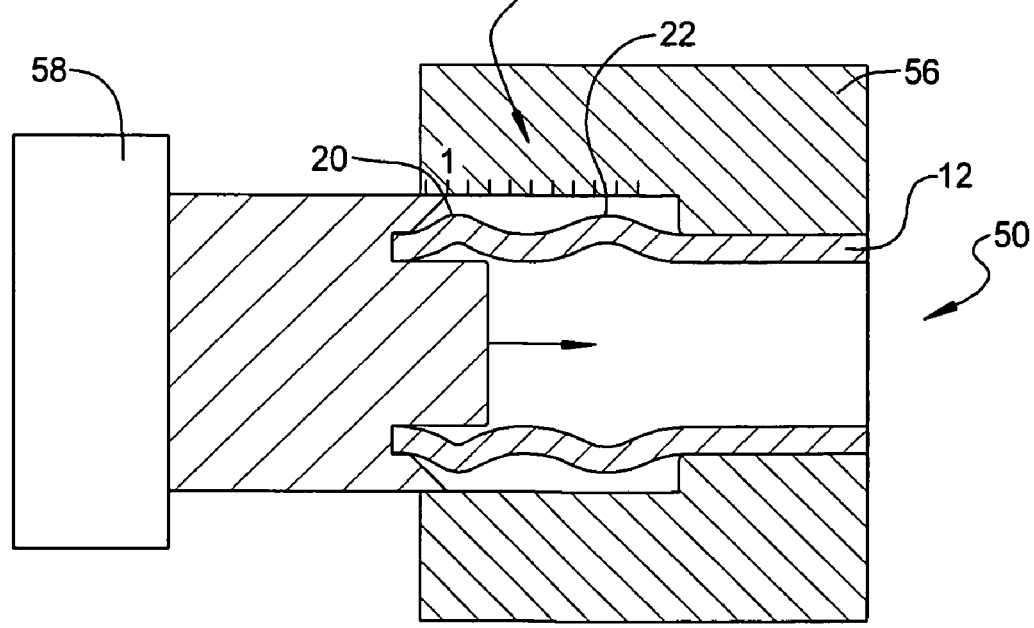
Figure 5C:
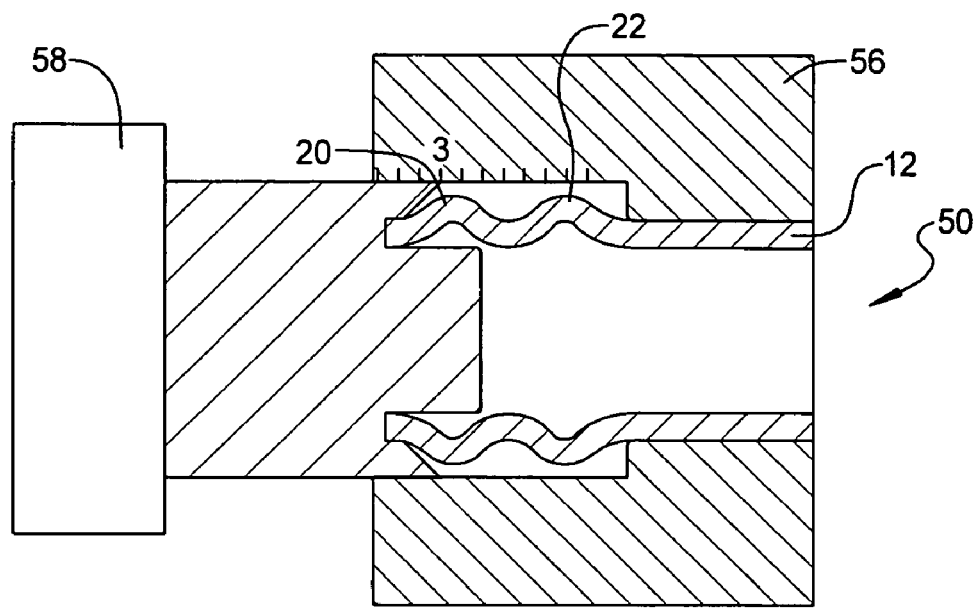
Figure 5D:
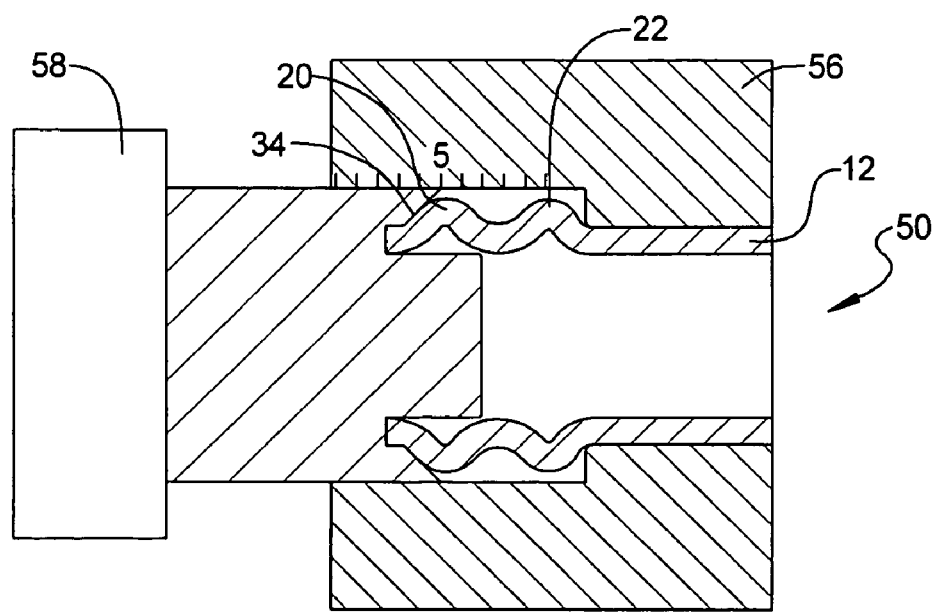
Figure 5E:
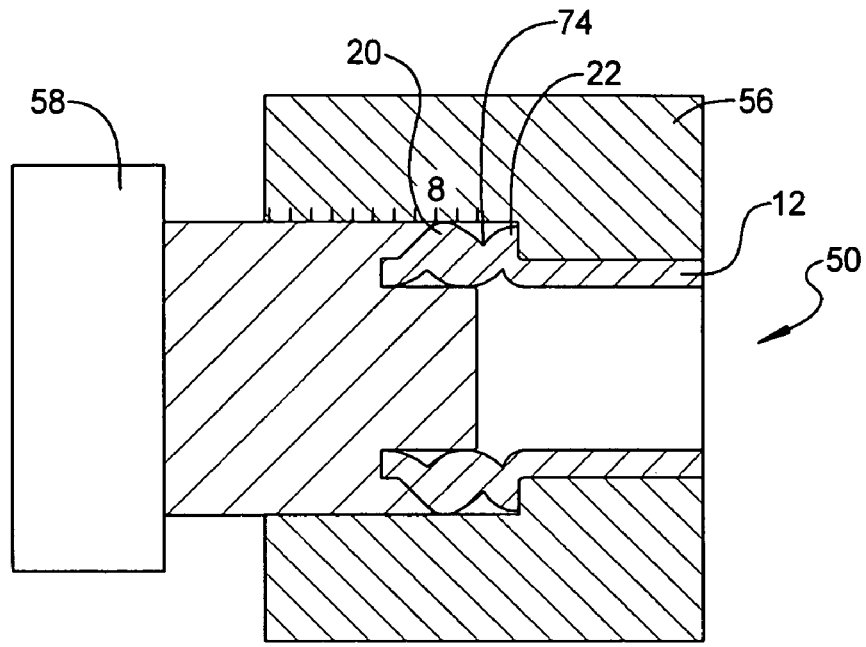
Figure 5F:
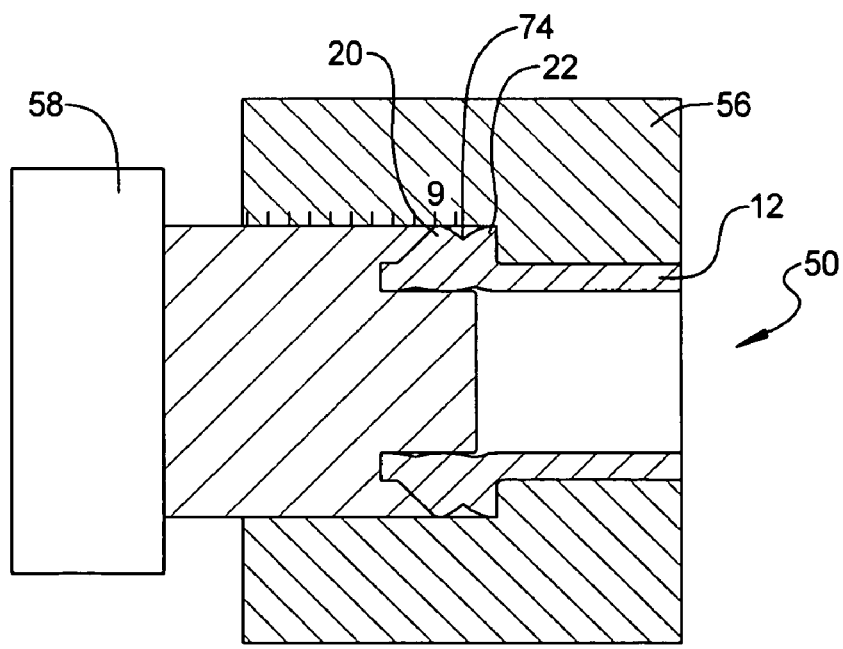
Figure 5G:
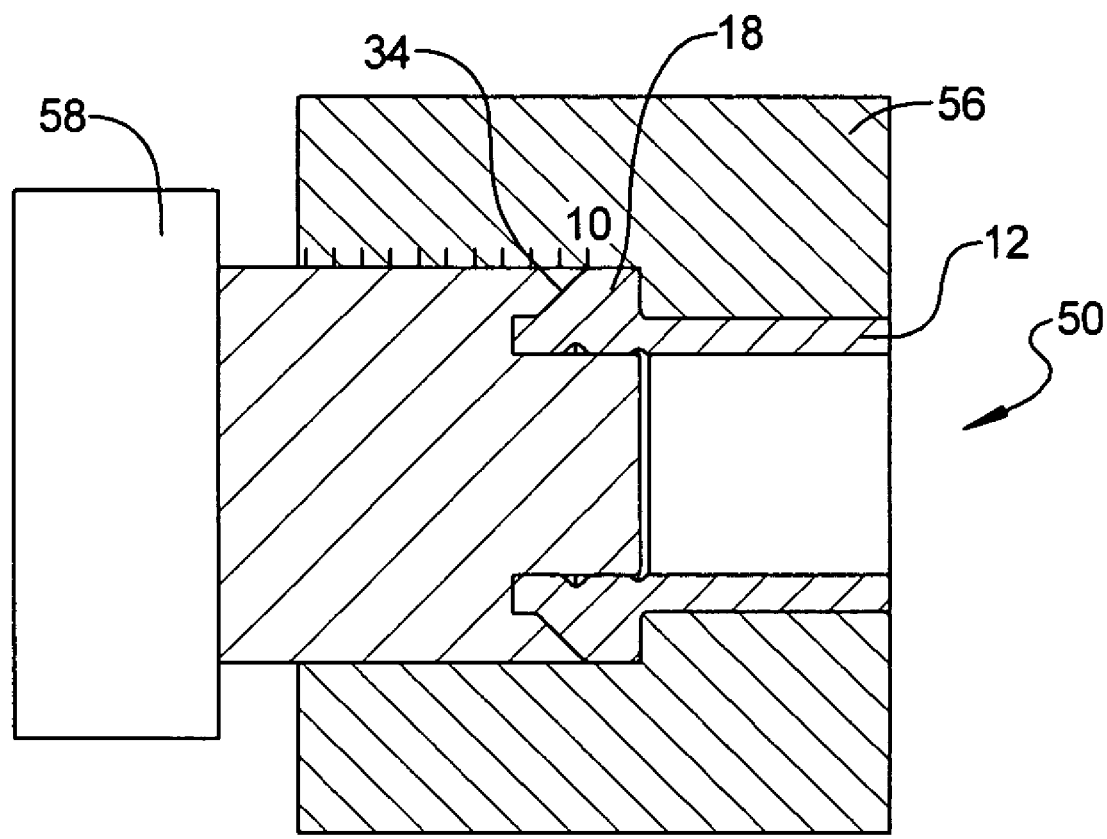

Once a blank is aligned on the punch member 58 and in the die member 56 as shown in FIG. 5A, the press assembly 50 may be engaged to commence the formation of first and second intermediate annular bead members 20, 22 as shown in FIGS. 5B-5D. It should be understood that while the method as illustrated depicts first and second intermediate annular beads 20, 22, a third or additional intermediate bead (s) may be effectively used in accordance with the present disclosure. In various aspects, the forming process includes engaging the press assembly and continuously axially advancing the punch member 58 into the die member 56 (or vice versa). In other aspects, the forming process includes a two-step punch process. A first punch member may be used to size the aluminum tube. For example, sizing the aluminum tube may include forming the first and second intermediate annular beads 20, 22, as shown in FIGS. 5B-5D. After the first punch member is removed, a second punch member may then be used to compress the intermediate annular beads 20, 22 to form one primary annular bead member 18, for example, as shown in FIGS. 5E-5G. While both a continuous press and a two-step punch process are practical methods to make the bead tube design according to the principles of the present disclosure, a two-step process may provide decreased tooling wear and ensure a more uniform, fully formed sealing bead during large scale production.

Depending upon the overall dimensions of the blank tube, an initial length of the tube may be at least about 0.25 to about 0.325 inches longer than a final length after being subject to cold working. For example, according to the principles of the present disclosure, a tube having an outer diameter of ⅜ inch is typically shortened by about 0.3 inches during the press operation and cold work process. When a two-step punch process is used, for example, the extending portion 62 of first punch member may be inserted into the tube between a distance of about 0.5 inch to about 0.575 inch to form the intermediate beads 20, 22. The extending portion of the second punch member may be inserted further into the tube, for example, between a distance of about 0.6 inch to about 0.675 inch.

For illustrative purposes, an indicator (having a range of 0-10) is provided at the upper area 60 of the die member 58 that indicates the progression of the assembly process throughout the illustrated threshold steps. Once commenced, the method continues by compressing the first and second annular beads 20, 22 together within the press assembly 50 to begin to form one combined primary annular bead member. As the blank tube 12 is initially compressed and cold worked, the first annular bead is shaped with the desired sealing surface 34 as indicated in FIGS. 5D-5E. In certain aspects, the exterior annular sealing surface 34 may be formed having an angle of about 45 degrees. In other embodiments, the exterior annular sealing surface 34 may be provided having an arcuate shape with a predetermined radius of curvature. It should be understood that the die member 56 and punch member 58 would need to be provided with an alternate desired mold shape.

As shown in FIGS. 5E-5F the compressing of the first and second intermediate annular beads 20, 22 comprises cold working the tube and applying a force sufficient to remove any axial gap 74 in the outer diameter between the first and second intermediate annular beads. As shown in FIG. 5G, which represents the final stage of the process, the first and second intermediate annular beads form a single primary annular sealing bead 18 with a substantially uniform inner diameter along an entire length of the tube connector 12. As previously discussed, the exterior annular sealing surface 34 comprises about one half of the length of the primary annular bead member 18 and the remainder 44, or secondary portion, of the bead member 18 may be formed having a substantially uniform exterior surface at about a 90 degree angle relative to a central axis of the tube.

In various aspects, the step of compressing the first and second intermediate annular beads 20, 22 to form the primary sealing bead 18 may include the use a press force of up to about 7 tons, or more. In this regard, the steps of compressing the first and second annular beads 20, 22 to form the primary annular bead member 18 and forming an exterior annular sealing surface 34 at the end of the primary annular bead member 18 may occur simultaneously. While it is envisioned that the press operation alone will form a uniform exterior annular sealing surface 34, in certain aspects, is may be desirable to optionally use an additional, secondary ironing step or machining operation to ensure a smooth and uniform sealing surface at the location of the metal-to-metal line seal.

Certain benefits of using a bead tube of the present disclosure are further described in the following comparative test examples. These examples are merely illustrative and do not in any way limit the scope of the disclosure as described and claimed.

As is known to those skilled in the art, once the bead tubes of the present disclosure are formed, they are typically assembled with first and second coupling members to form a tube fitting assembly and are then shipped to an end user. During the shipment, certain vibrations and movement may cause the undesirable loosening of the assembly, which ultimately may lead to components of the assembly coming apart. As used herein, the term break loose torque is used to define the amount of torque required to break the resistance between assembled male and female coupling members (e.g., a nut and bolt). It has been shown that the break loose torque of the bead tubes of the present disclosure is clearly superior to those of the prior art.

The following tables provide comparative values for the break loose torque of a bead tube made in accordance with the present disclosure (Tables 1 and 3) and a prior art bead tube (Tables 2 and 4). The prior art bead tube has two adjacent bead members separated by a U-shaped valley. All assembly torques are performed at room temperature at 100 inch lbs. torque installation. The assemblies are then baked in an oven for 1 hour at the indicated temperature and allowed to cool prior to obtaining each break loose torque. A new bead tube was used for each temperature interval.

Tables 1 and 2 (below) provide a comparative analysis of the break loose torques required (with units of inch lbs) for a bead tube assembled with a steel safety valve, i.e., having a steel female inlet, and a brass male nut. As indicated in Table 2, at least one prior art bead tube, Sample 2a, had a completely loose fitting (which may be considered a failure) after being baked for 1 hour at 300° F.

TABLE 1

(Required break loose torque for a Bead Tube according to the present disclosure)

| SAMPLE # | 200° F. | 250° F. | 300° F. |
|---|---|---|---|
| 1a | 27.5 | 10.0 | 5.0 |
| 1b | 32.5 | 10.0 | 5.0 |
| 1c | 22.5 | 20.0 | 5.0 |
| 1d | 32.5 | 25.5 | 12.5 |
| 1e | 35.0 | 15.0 | 7.5 |

TABLE 2

(Required break loose torque for a Prior Art Bead Tube)

| SAMPLE # | 200° F. | 250° F. | 300° F. |
|---|---|---|---|
| 2a | 12.5 | <5.0 | N/A* |
| 2b | 15.0 | <5.0 | <5.0 |
| 2c | 10.0 | 5.0 | <5.0 |
| 2d | 15.0 | 5.0 | <5.0 |
| 2e | 20.0 | 7.5 | <5.0 |

Tables 3 and 4 (below) provide a comparative analysis of the break loose torques required (with units of inch lbs) for a tube bead assembled with an aluminum pressure regulator, i.e., having an aluminum female inlet, and a brass male nut.

TABLE 3

(Required break loose torque for a Bead Tube according to the present disclosure)

| SAMPLE # | 200° F. | 250° F. | 300° F. |
|---|---|---|---|
| 3a | 70 | 70 | 65 |
| 3b | 70 | 65 | 60 |
| 3c | 70 | 65 | 60 |
| 3d | 80 | 65 | 55 |
| 3e | 75 | 70 | 60 |

TABLE 4

(Required break loose torque for a Prior Art Bead Tube)

| SAMPLE # | 200° F. | 250° F. | 300° F. |
|---|---|---|---|
| 4a | 60 | 45 | 40 |
| 4b | 55 | 40 | 30 |
| 4c | 65 | 45 | 45 |
| 4d | 45 | 45 | 40 |
| 4e | 55 | 40 | 40 |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reusable tube fitting assembly for a gas burner, comprising:
    a pre-deformed tube connector having first and second ends, at least one of the ends having a single annular sealing bead comprising at least two intermediate annular beads compressed and cold worked together, the single annular sealing bead comprising a primary sealing surface portion and a secondary portion adjacent the primary sealing surface portion, the secondary portion formed having an exterior surface free of any axial gap between the intermediate annular beads;
    a first coupling member defining a cavity and having a shaped sealing surface adapted to sealingly engage a cooperating surface of the annular sealing bead; and
    a second coupling member rotatably and slidably disposed on the pre-deformed tube member and adapted to mate with the first coupling member;
    wherein the pre-deformed tube connector does not undergo any plastic deformation during assembly of the first and second coupling members.

2. A tube fitting assembly according to claim 1, further comprising a sealing member radially aligned on the pre-deformed tube connector and disposed between the annular sealing bead and the second coupling member.

3. A tube fitting assembly according to claim 1, wherein the pre-deformed tube connector comprises an arcuately shaped annular sealing surface and the first coupling member has a cooperating arcuately shaped sealing surface.

4. A tube fitting assembly according to claim 1, wherein the first coupling member comprises internal female threads and the second coupling member comprises external mating threads.

5. A tube fitting assembly according to claim 1, wherein the pre-deformed tube connector comprises aluminum and at least one of the first and second coupling members comprises a brass fitting.

6. A tube fitting assembly according to claim 1, wherein the annular sealing bead is disposed between a lead-on portion and a main body portion of the pre-deformed tube connector, the lead-on portion and the main body portion having substantially the same size outer diameter.

7. A tube fitting assembly according to claim 1, wherein the pre-deformed tube connector comprises an inner diameter having a substantially constant dimension along its entire length.

8. A tube fitting assembly according to claim 1, wherein the annular sealing bead comprises a primary sealing surface portion having an angle of about 45 degrees.

9. A tube fitting assembly according to claim 1, wherein the annular sealing bead comprises an arcuate shaped portion with a predetermined radius of curvature.

10. A tube fitting assembly according to claim 1 wherein the primary sealing surface portion is provided having an angle of about 45 degrees.

11. A reusable tube fitting assembly for a gas burner, comprising:
    a pre-deformed aluminum tube connector having first and second ends, at least one of the ends having a single annular sealing bead comprising at least two intermediate annular beads compressed and cold worked together, the single annular sealing bead comprising a primary sealing surface portion and a secondary portion adjacent the primary sealing surface portion, the secondary portion formed having an exterior surface free of any axial gap between the intermediate annular beads forming an arcuately shaped annular sealing surface;
    a first coupling member defining a cavity and having an arcuately shaped sealing surface adapted to sealingly engage the arcuately shaped surface of the annular sealing bead; and
    a second coupling member rotatably and slidably disposed on the pre-deformed tube member and adapted to mate with the first coupling member;
    wherein the pre-deformed aluminum tube connector does not undergo any plastic deformation during assembly of the first and second coupling members.

12. A tube fitting assembly according to claim 11, wherein the pre-deformed aluminum tube connector comprises an inner diameter having a substantially constant dimension along its entire length.

13. A tube fitting assembly according to claim 11, wherein the cold working of the intermediate annular beads together is sufficient to remove any axial gap in an outer diameter between the intermediate annular beads.

14. A tube fitting assembly according to claim 11, wherein the annular sealing bead is disposed between a lead-on portion and a main body portion of the pre-deformed tube connector, the lead-on portion and the main body portion having substantially the same size outer diameter.

* * * * *